United States Patent
Narayan et al.

(10) Patent No.: US 9,218,622 B2
(45) Date of Patent: Dec. 22, 2015

(54) SYSTEM AND METHOD OF DECOUPLING AND EXPOSING COMPUTING DEVICE ORIGINATED LOCATION INFORMATION

(75) Inventors: Pramodh D. Narayan, Naperville, IL (US); Sri Ramanathan, Lutz, FL (US); Matthew A. Terry, Dunwoody, GA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 13/590,340

(22) Filed: Aug. 21, 2012

(65) Prior Publication Data

US 2012/0314861 A1 Dec. 13, 2012

Related U.S. Application Data

(63) Continuation of application No. 12/114,316, filed on May 2, 2008, now Pat. No. 8,315,388.

(51) Int. Cl.
*H04L 29/06* (2006.01)
*G06Q 40/00* (2012.01)
*H04W 4/02* (2009.01)
(Continued)

(52) U.S. Cl.
CPC ............ *G06Q 40/00* (2013.01); *H04L 63/0428* (2013.01); *H04L 67/18* (2013.01); *H04L 67/20* (2013.01); *H04L 67/2804* (2013.01);
(Continued)

(58) Field of Classification Search
CPC ....... H04W 64/00; H04W 4/02; G06Q 40/00; H04L 63/0428; H04L 67/18; H04L 67/2804; H04L 67/20; H04L 67/30

USPC ................. 380/247, 252, 258, 270; 713/151; 455/402, 440

See application file for complete search history.

(56) References Cited

U.S. PATENT DOCUMENTS 6,115,754 A 9/2000 Landgren
6,138,003 A 10/2000 Kingdon et al.
(Continued)

FOREIGN PATENT DOCUMENTS

FR 2799594 4/2001
WO 2008112663 A2 9/2008

OTHER PUBLICATIONS

Douglas S. J. De Couto, and Robert Morris, Location Proxies and Intermediate Node Forwarding for Practical Geographic Forwarding, Jun. 2001, MIT Laboratory for Computer Science, pp. 1-14, downloaded from http://pdos.csail.mit.edu/papers/ on Jan. 2, 2015.*

(Continued)

*Primary Examiner* — Victor Lesniewski
*Assistant Examiner* — Gary Lavelle
(74) *Attorney, Agent, or Firm* — Matthew Chung; Roberts Mlotkowski Safran & Cole, P.C.

(57) ABSTRACT

A system and method is provided to determine location information of a portable computing device and, in particular, to a secure and scalable system and method of decoupling and exposing handset originated location information to third parties. The system includes a location platform to determine location information of a remote user, and an encryption service configured to secure the location information of the remote user and send the secure location information to a content provider.

19 Claims, 5 Drawing Sheets

(51) Int. Cl.
  *H04W 4/20* (2009.01)
  *H04L 29/08* (2006.01)
  *H04W 64/00* (2009.01)

(52) U.S. Cl.
  CPC ............... *H04L67/30* (2013.01); *H04W 4/02* (2013.01); *H04W 4/20* (2013.01); *H04W 64/00* (2013.01)

(56) References Cited

U.S. PATENT DOCUMENTS

| | | | |
|---|---|---|---|
| 6,456,854 | B1 | 9/2002 | Chern et al. |
| 6,944,447 | B2 | 9/2005 | Portman et al. |
| 7,013,391 | B2 | 3/2006 | Herle et al. |
| 7,023,995 | B2 | 4/2006 | Olsson |
| 2001/0055392 | A1* | 12/2001 | McDonnell et al. .......... 380/258 |
| 2003/0078053 | A1 | 4/2003 | Abtin et al. |
| 2003/0125042 | A1 | 7/2003 | Olrik |
| 2003/0225893 | A1* | 12/2003 | Roese et al. .................. 709/227 |
| 2004/0114558 | A1 | 6/2004 | Krishnamurthi et al. |
| 2005/0228860 | A1* | 10/2005 | Hamynen et al. ............. 709/203 |
| 2007/0026871 | A1* | 2/2007 | Wager ......................... 455/456.1 |
| 2007/0099634 | A1 | 5/2007 | Chari et al. |
| 2007/0101438 | A1* | 5/2007 | Govindarajan ................. 726/27 |
| 2007/0153715 | A1* | 7/2007 | Covington et al. ............ 370/315 |
| 2007/0233695 | A1* | 10/2007 | Boudreau et al. ............... 707/10 |
| 2007/0234404 | A1 | 10/2007 | Bogdanovic et al. |
| 2007/0264974 | A1 | 11/2007 | Frank et al. |
| 2008/0033646 | A1* | 2/2008 | Morgan et al. ................. 701/213 |
| 2009/0165116 | A1* | 6/2009 | Morris ............................ 726/14 |

OTHER PUBLICATIONS

Vancouver Webpages. "Geographic Extensions for the HTTP Transactions", Internet Engineering Task Force, IETF, CH, No. 5, Dec. 7, 2007.

* cited by examiner

SYSTEM AND METHOD OF DECOUPLING AND EXPOSING COMPUTING DEVICE ORIGINATED LOCATION INFORMATION

CROSS REFERENCE TO RELATED APPLICATION

The present application is a continuation of U.S. application Ser. No. 12/114,316, filed May 2, 2008, the contents of which are incorporated by reference herein in their entirety.

FIELD OF THE INVENTION

The invention generally relates to a system and method to determine location information of a portable computing device and, in particular, to a secure and scalable system and method of decoupling and exposing handset originated location information to third parties.

BACKGROUND

Faced with an increasingly difficult challenge in growing both average revenue per user (ARPU) and numbers of subscribers, wireless carriers are trying to develop a host of new products, services, and business models based on data services. One such service is location services, which provide information specific to a location. It is expected that location based services will generate additional business for the carrier, from both the mobile user and content providers.

For the mobile user as well as the service provider (wireless carriers and content provider), location-based services offer many opportunities. For example, location-based services can increase revenue of the service provider, e.g., network carrier and content provider, while improving services to end users, e.g., mobile users. Some examples of location-based services that can be provided to the mobile user include:
  Providing the nearest business or service, such as an ATM or restaurant;
  Providing alerts, such as notification of a sale on gas or warning of a traffic jam; and
  Providing weather reports which are germane to the location where the user is currently located, etc.
For the network carrier, location-based services provide value add by enabling services such as:
  Resource tracking with dynamic distribution (e.g., Taxis, service people, rental equipment, doctors, fleet scheduling);
  Finding people or information for the user (e.g., person by skill (doctor), business directory, navigation, weather, traffic, room schedules, stolen phone, emergency 911);
  Proximity-based notification (push or pull) (e.g., targeted advertising, buddy list, common profile matching (dating), automatic airport check-in); and
  Proximity-based actuation (push or pull) (e.g., payment based upon proximity.
While the potential of these services is obviously great, and there is a considerable amount of interest with respect to these services, there are a number of issues that have to date limited the actual rollout and deployment of these services. These issues include for example,
  Wireless service providers have not yet determined the appropriate authorization model around these services, in order to protect consumer privacy and conform to a rapidly evolving regulatory environment;
  There are challenges being faced by the wireless service provider community with respect to the actual revenue generating services to roll out and the priority with which this should happen;
  External content providers who hold the keys to content are hesitant to allow service providers access to top tier content (e.g., movies and music, etc.), preferring to maintain their existing relationships with their subscribers; and
  Location platforms (i.e., network carrier equipment used to pinpoint location of user) which are centrally housed in carrier networks (especially in current 3G networks) have known issues with respect to throughput, latency, in terms of actual location transactions, etc. Also, cell sector dips (manner in which to determine user locations (either coarse or fine granularity)) are expensive, with precise fixes even more resource expensive.

In addition, for purposes of location based services, external content providers typically request location from the carrier domain on a transactional basis. For example, a weather service content provider would typically request location information pertaining to a subscriber as soon as a request was received from the handset, resulting in addition latency received by this request from a subscriber perspective. It is also known that the process for a third party to gain access to a carrier's location platform is a long and expensive process because the third party has to build the integration infrastructure and the carrier must set up their location platform to accept and throttle the requests. There is also a certification and shakeout period, which can be an expensive and slow process.

Accordingly, there exists a need in the art to overcome the deficiencies and limitations described hereinabove.

SUMMARY

In a first aspect of the invention, a system comprises a location platform to determine location information of a remote user, and an encryption service configured to secure the location information of the remote user and send the secure location information to a content provider.

In another aspect of the invention, a method for obtaining location specific content comprises intercepting an HTTP request from a remote user and scrambling location information of the remote user. The scrambled location information is inserted into a header of the HTTP request. The scrambled location information is sent to a content provider.

In another aspect of the invention, a computer program product comprises a computer usable medium having readable program code embodied in the medium. The computer program product includes at least one component operable to: determine location information of a remote user; intercept an HTTP request from the remote user; scramble the location information and insert the scrambled location information into a header of the HTTP request; and transmit the scrambled location information to a content provider.

In yet another aspect of the invention, a method is provided for deploying an application for securely providing location information. The method comprises providing a computer infrastructure being operable to: intercept an HTTP request from the remote user; scramble the location information and insert the scrambled location information into a header of the HTTP request; and transmit the scrambled location information to a content provider.

BRIEF DESCRIPTION OF VIEWS OF THE DRAWINGS

The present invention is described in the detailed description which follows, in reference to the noted plurality of drawings by way of non-limiting examples of exemplary embodiments of the present invention.

FIG. 1 shows a general schematic overview of the present invention.

DETAILED DESCRIPTION

Figure 1:
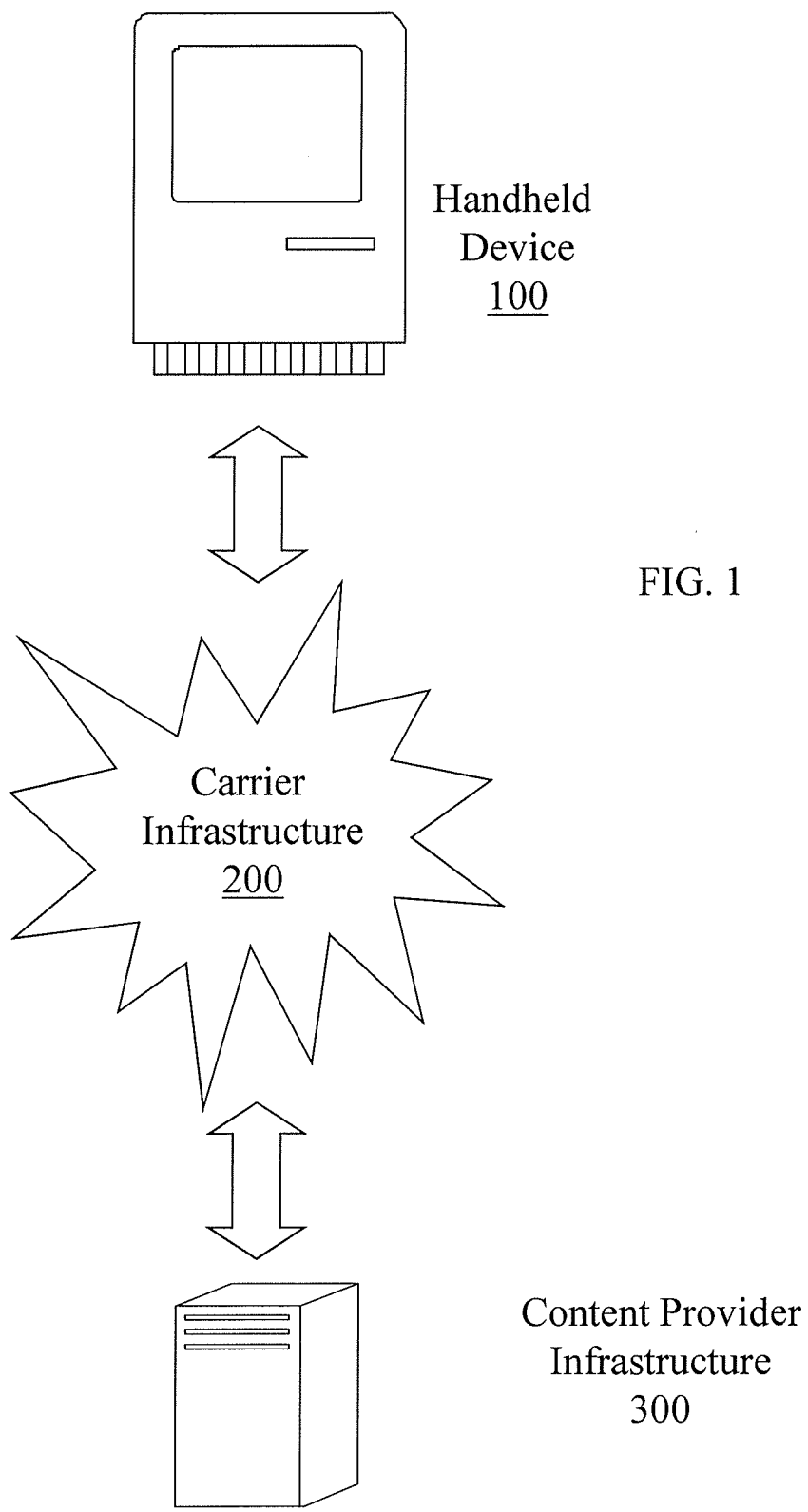

The invention generally relates to a system and method to determine location information of a computing device. In particular, the present invention provides a secure and scalable system and method of decoupling and exposing handset originated location information to third parties in order to obtain location specific content from a content provider. Advantageously, the invention simplifies the location retrieval for third party content providers while continuing to offer location as a revenue generating service for service providers (network carriers).

As content providers are working at a frantic pace to make their content more mobile friendly, the present invention will allow the service providers to cater to handset based consumers without the need for content providers to build a new infrastructure for the dissemination of their content. Also, the present invention improves the operational efficiency associated with realizing location sharing between network carriers and trusted third parties (content providers) for the purpose of providing location information to the content provider which, in turn, can provide location specific content (e.g., weather report) to the user (handheld device). By using the system and method, the user no longer has to manually specify ZIP codes or other location identifiers to use location based services, when they roam into a different location.

In implementation, the present invention provides a mechanism of securely providing the location information to the trusted third party without any major modifications to the existing infrastructure of the network carrier. (This is compared to current systems in which adapting a web site to obtain location information means that an existing content provider has to implement major infrastructure changes to accommodate location (e.g., integrate with the carrier infrastructure)). Thus, the present invention allows for the reuse of the existing OTA (Over the Air) provisioning infrastructure that network carriers have invested significant dollars in already, with minimum adaptation to support handset agents on MIDP and non-MIDP compliant handheld devices. The present invention also allows for network carriers to share location information with partners without compromising privacy, which is an issue facing the commercialization of location based services. Also, this invention provides the network carriers viable means of protecting their investments and a path to realize better ARPU (Average Revenue per Unit) from location based services in view of devices with A-GPS chipsets which can send location information directly to third parties and thus bypass the carrier pipe.

The present invention also relies on the existence of a basic authorization model and assumes that subscribers, service providers (e.g., network carriers) and content providers have opted into the appropriate services (e.g., location based services) and subsequent sub-services (e.g., location based weather services). In embodiments, the present invention can be implemented in numerous ways in order to obtain content from a content provider based on location information. These methods can include, for example, detecting location resident in header information of an HTTP request sent by the handheld device, securely bundling the location information, service subscription information and content request in the HTTP header with an authorization key and providing such information to an appropriate content provider. The content provider can then use the location information to provide the appropriate location specific content to the requesting party, without the need for building the integration infrastructure, setting up their own location platform to accept and throttle the requests, or requesting certification and shakeout period from the network carrier.

In embodiments, the location information can be obtained by an agent sitting locally on the handheld device (also referred to as a handset, PDA, mobile computing device, etc.), at a service provider or network carrier infrastructure. The agent can be used to determine location information using many different methodologies. By way of one example, a local agent residing on the handheld device can use locally cached location information obtained by GPS, A-GPS or mechanisms other than the telecommunications network in order to determine location information. In other embodiments, the agent can obtain information from control plane locating, e.g., the service provider (e.g., network carrier) obtains the location based on the signal-strength of the closest cell-phone towers. The system of the invention requires no reverse tunneling or reverse proxying infrastructure.

The signal provided to the carrier may be, for example, a wireless application protocol (WAP). Those of skill should recognize that WAP enables access to the Internet from a handheld device. For example, a WAP browser provides all of the basic services of a computer based web browser but simplified to operate within the restrictions of the handheld device. Those of skill in the art should also appreciate that the present invention is not limited to WAP applications, but may be implemented using any wireless data protocol such as, for example, the Japanese i-mode system.

EXEMPLARY SYSTEM ENVIRONMENT AND INFRASTRUCTURE

FIG. 1 shows a general schematic overview of the present invention. Specifically, in implementation, a handheld device 100 will send an HTTP request to a content provider 300 over a network carrier (infrastructure) 200. In use, each HTTP request travels across the infrastructure of the network carrier 200 before being routed through the Internet to the content provider 300 (destination site). Before leaving the infrastructure of the network carrier 200, a unique scrambled (encrypted) component containing the user's location information is added to the HTTP request. An authorizing key may also be sent to the content provider in order to gain authorization to the location information.

The location information may be obtained directly from the location platform (on the network carrier infrastructure 200) or, optionally, on an agent residing locally on the handheld device 100. In either scenario, the location platform or local agent intercepts the HTTP stream and inserts the location information into the header of the HTTP request. The user's location information can contain different levels of precision such as:

Coarse location (cell sector) along with a timestamp associated with when the fix was made;

Precise location along with a timestamp associated with when the fix was made; or A data structure that contains both coarse and fine location.

The content provider 300 can access the HTTP request and in particular the user's location information by many different methodologies. For example, the network carrier 200 can provide the content provider 300 with a decryption key that expires in a set amount of time and/or after a predetermine limit of uses. Alternatively, the network carrier 300 (or service provider) can provide a network carrier hosted decryption service (API) that accepts the encrypted location data from the user's HTTP request (and/or ID of the content provider 300 and/or handheld device 100). In this latter scenario, the network carrier hosted decryption service would return the unencrypted user's location to the content provider 300. The network carrier 200 hosted decryption service can also enforce a limited number of decryption requests per time period, etc. The API call back to the network carrier 200 is significantly less intensive than the currently available location call.

In embodiments, a charging model can be implemented to increase revenue of both the network carrier 200 and the content provider 300. For example, the network carrier 200 can charge the content provider 300 for the location information services on a per request basis, type and/or amount of requested content, etc. Additionally, the network carrier 200 can charge differently for decrypting coarse location versus fine location or based on a subscription and/or other fee agreement. On the other hand, the content provider 300 can charge the end user (handheld device 100) for specific content, on a per request fee, on a subscription basis or other charging scheme.

Figure 2:
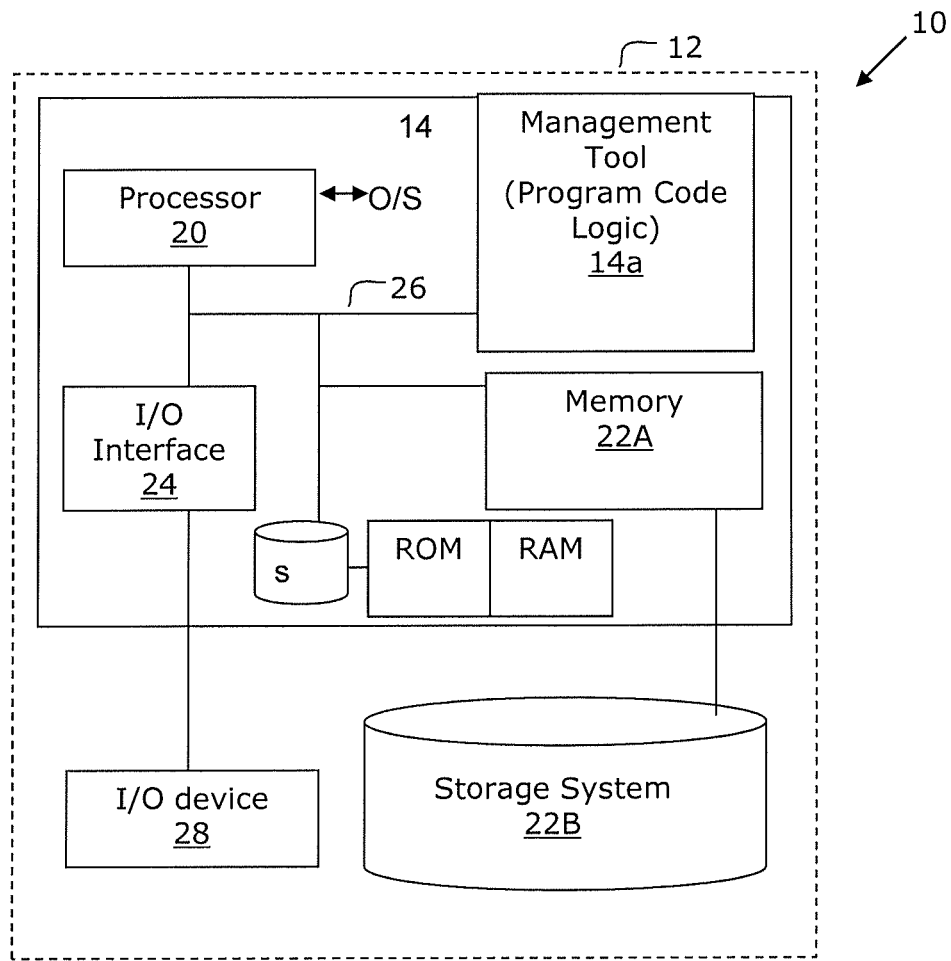
FIG. 2 shows an illustrative environment for implementing the steps in accordance with the invention.

FIG. 2 shows an illustrative environment 10 for managing the processes in accordance with the invention. To this extent, the environment 10 includes a server 12 that can perform the processes described herein. In particular, the server 12 includes a computing device 14, which can be resident on an infrastructure of a network carrier, a content provider server, or other third party service provider (any of which is generally represented as reference numeral 200 in FIG. 1).

The computing device 14 includes a Management Tool (Agent) 14a configured to make computing device 14 operable to perform the services described herein. The implementation of the Management Tool 14a will provide a speedy and efficient way in which partners (e.g., content providers and network carriers) are boarded onto location platforms within the carrier network. By way of illustration, the Management Tool 14a can intercept the HTTP request, determine location and service subscription information of the user, encrypt such information and send it to the content provider, without the need for any major infrastructure overhaul by either the network carrier or content provider.

More specifically, in one implementation, the Management Tool 14a determines a location of the handheld device using control plane locating methodologies. The Management Tool 14a can also be provided with the location information from a local agent residing on the handheld device. For example, the local agent can obtain location information by GPS, A-GPS or mechanisms other than the telecommunications network. The Management Tool 14a can also determine whether the user is entitled to certain services/content by using, for example, a simple look-up table that matches the ID of the handheld device to available content/services. This look-up table can also be resident on a server at the content provider, and periodically updated by the service provider.

As this information is obtained, the Management Tool 14a can insert an authorizing key (e.g., via encryption) into the header of the HTTP request which, in turn, is forwarded to a specific content provider. The authorizing key may be obtained based on many different charging models as described herein. The authorizing key ensures secure transmission of the deliver location information to a content provider and, in embodiments, provides authorization to use the location information for location specific content dissemination. The content provider can open the HTTP request, decrypt the information (or request the content provider to decrypt the information), read the information, (e.g., location information, requested content, etc.) and provide the requested location-based content to the user through the carrier infrastructure.

In embodiments different charging models are contemplated by the present invention. For example, the service provider or network carrier can charge the content provider on a per request basis, bulk basis or flat rate model for the end user location information. A fee can also be based on the type of location information provided to the content provider, e.g., fine or coarse location. Any of these models will be less expensive than the expenditures needed to build and maintain a standalone infrastructure for such services. In return, the content providers can generate revenue from the end user by charging a flat fee, per use charge, etc. for the location based content.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement and/or the service provider can receive payment from the sale of advertising content to one or more third parties.

EXEMPLARY PROCESSES

Figure 3:
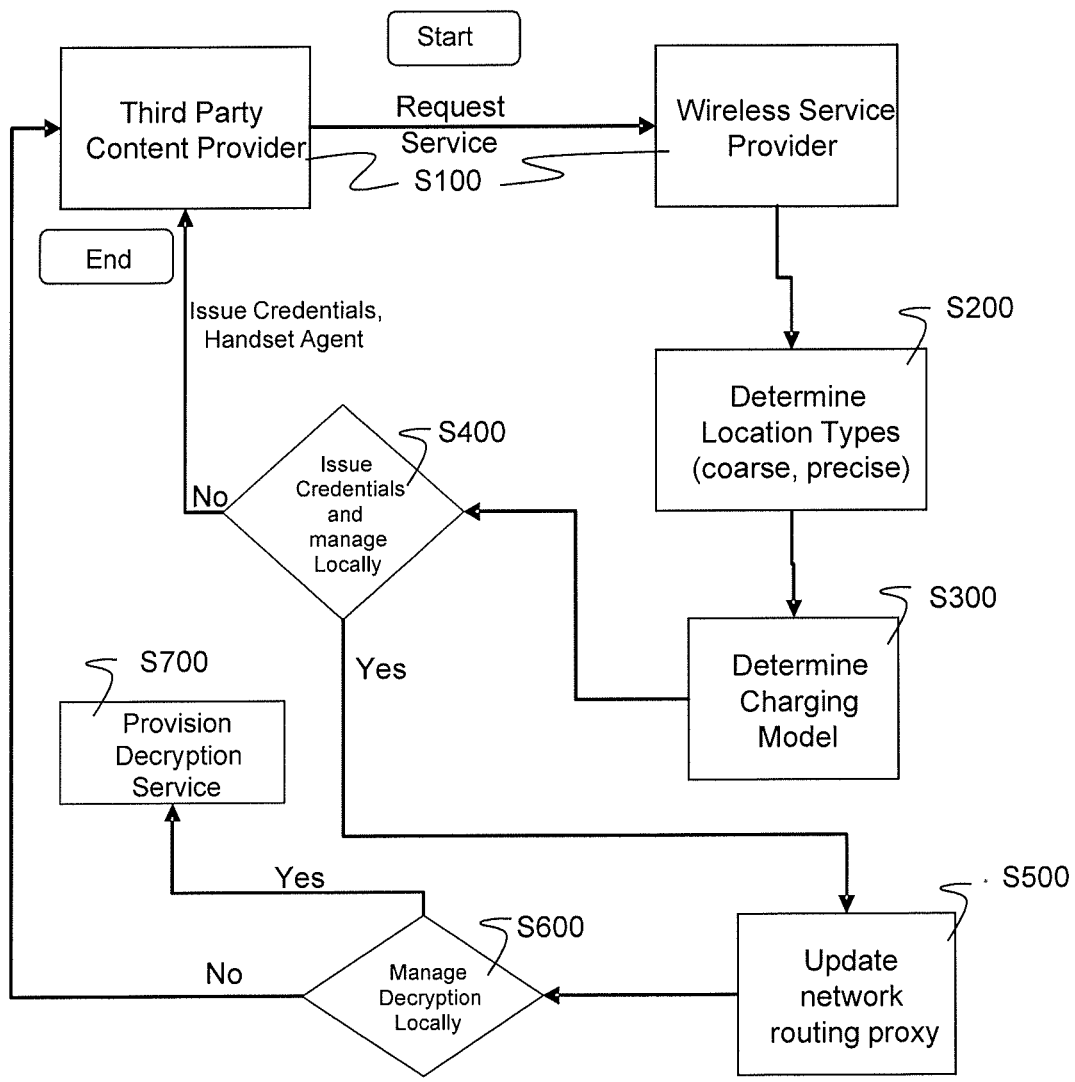
FIG. 3 shows a flow chart of an exemplary process in accordance with aspects of the invention.

FIG. 3 is a flow chart implementing steps of the invention, which may be implemented in the environment of FIGS. 1 and 2. FIG. 3 may equally represent a high-level block diagram of the invention. The steps of FIG. 3 may be implemented and executed from either a server, in a client server relationship, or they may run on a user workstation (which can be generally represented in FIGS. 1 and 2). Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIGS. 1 and 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 3 illustrates an exemplary process in which the service provider and content provider initiate and establish a relationship in accordance with the invention. In particular, at step S100, the content provider and service provider initiate an attempt to establish a relationship by which location exposure is enabled. In embodiments, at step S100, the content provider requests this service from the service provider, e.g., network carrier or third party service provider.

At step A200, the service provider and content provider decide the type of service that is required. For example, at step S200, a determination is made as to whether coarse or fine location (or both) is required and which content will be available to an end user, based on location information.

At step S300, a charging model will be established between the service provider and the content provider. The charging model may be, for example, a requirement that accounting records from the participating nodes in the call flow be sent into the carrier platform, a flat fee based service or a fee based on coarse or fine location information or a host of other usage options as discussed herein and equivalents thereof. After this, the actual deployment model is finalized. This could result in several scenario models as discussed in more detail below. For example, at step S400, the carrier network may determine whether the end user is entitled to such services, in which case the carrier network will issue the credentials (authorizing key) to the content provider. The carrier network will also determine whether location information was obtained locally at the handheld device.

If the location information was not obtained locally at the handheld device, the process continues to the third party content provider. That is, at this phase, the location information (obtained by the location platform) and the credentials are securely sent to the third party content provider. The third party content provider can then decrypt the location information via the methodologies discussed herein. The requested location sensitive content can then be sent back to the end user.

If the location information was obtained locally at the handheld device, the process continues to S500. At step S500, the network carrier will update the network routing proxy. More specifically, at step S500, the network carrier establishes a routing model which may include, for example, a look-up table (e.g., stored in the storage 22B) which stores routing information, matching information between the end user and content provider, user ID information, etc. In embodiments, the network carrier and/or service provider can white-list sites where location information can be sent and blacklist sites where location information cannot be sent. The proxy is also configured to scramble (encrypt) a tag (location information) in the HTTP header of the request, such that the location information in the HTTP request can be securely transmitted to the content provider.

Regardless of the proxy in the carrier domain, decryption can be local to the content provider or hosted as a service exposed by the service provider. As such, at step S600, a determination is made as to whether the decryption will be managed locally (at the network carrier or content provider). If the decryption is to be handled locally, at step S700, the message is decrypted. The process will continue to the content provider, which will provide the location specific content. If the decryption is not to be handled locally, the process will continue to the content provider, which will decrypt the location information, amongst other possible encrypted data.

EXEMPLARY EMBODIMENTS

Figure 4:
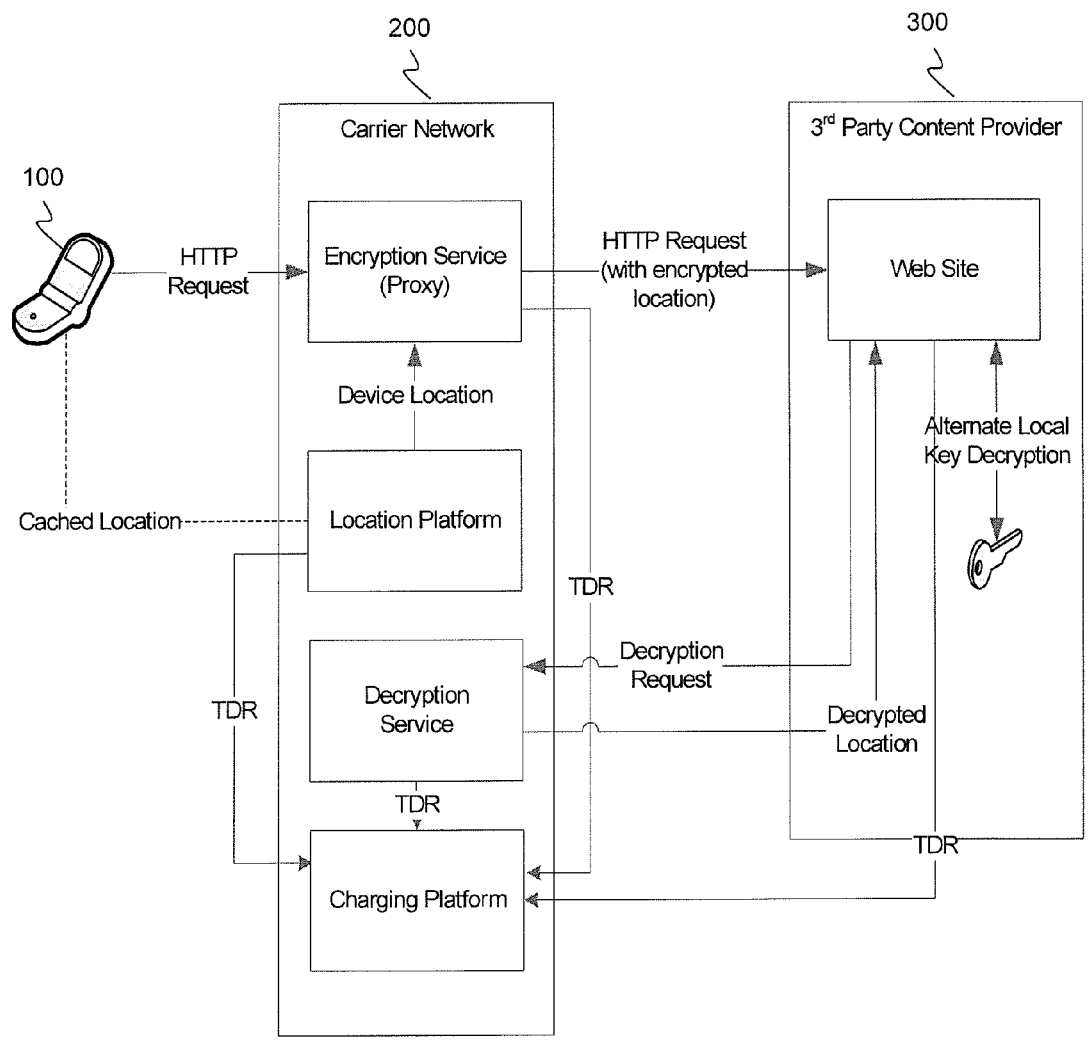
FIGS. 4 and 5 show alternative embodiments implementing aspects of the invention.
Figure 5:
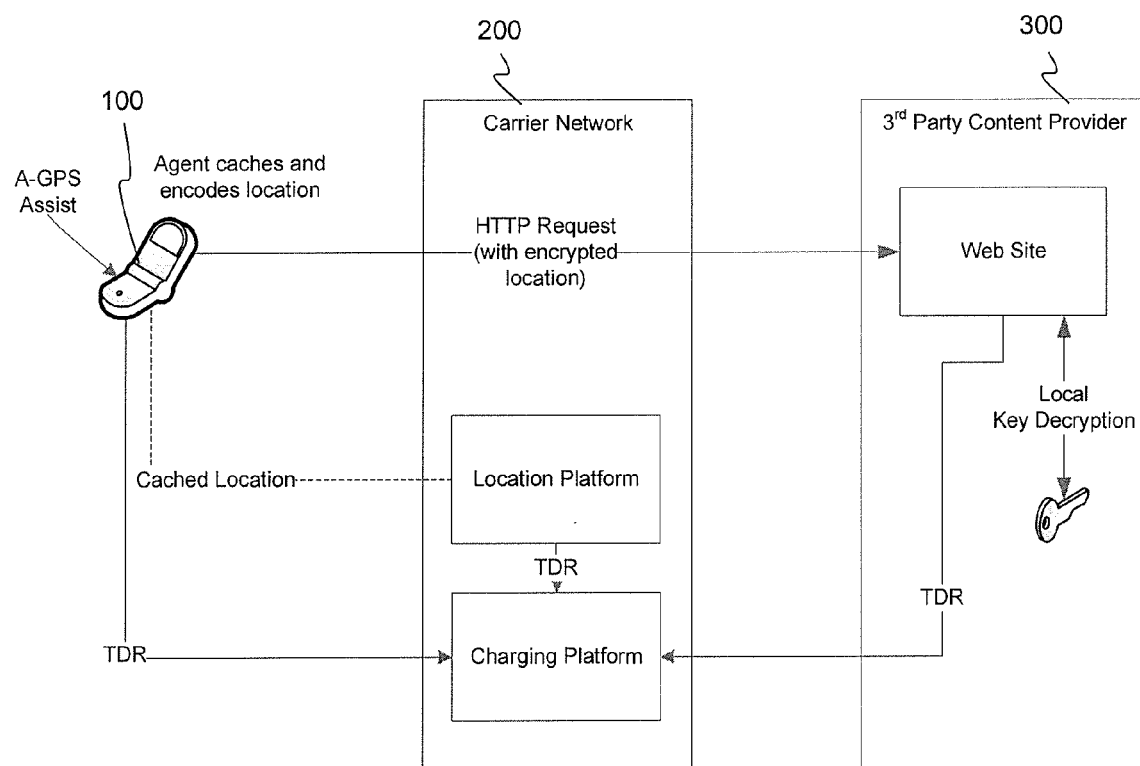

FIGS. 4 and 5 show alternative embodiments implementing aspects of the invention. FIGS. 4 and 5 may equally represent high-level flow diagrams implementing processes in accordance with aspects of the invention. Both FIGS. 4 and 5 show a handheld device 100, a carrier network 200 and a content provider 300. The carrier network 200 includes an encryption service, location platform, decrypting service and charging platform (all of which was generally referred to as the Management Tool 14a), which is described in more detail below.

More specifically, as shown in FIG. 4, the handheld device 100 sends an HTTP request to the content provider 300. The carrier network 200 intercepts the HTTP request and inserts scrambled location information into the request, either obtained from a location platform or from the device itself. In FIG. 4, the scrambled location information is provided by the encryption service (proxy). In the contemplated embodiment of FIG. 4, the location platform provides the location information (although in other embodiments, the location platform can receive the cached location information from the handheld device). The carrier infrastructure 200 sends the encrypted information (location information, user ID, etc.) to the content provider 300, which decrypts the location information with a decryption key obtained from the network carrier 200 or service provider. The decryption key allows the content provider 300 to identify the handheld device, look for the key and unscramble the embedded location information in the header of the HTTP request.

Alternatively, the network carrier 200 (or other service provider) can provide decryption services using, for example, a decryption service as discussed above (also referred to as a decryption agent). The decryption service allows the content provider 300 to decrypt location information from the HTTP header request. The network carrier 200 (or service provider) can provide the optional local decryption service negotiated before hand as part of the provisioning flow. Thus, the decryption agent (e.g., decryption service) allows the network carrier 200 to identify the handheld device, look for the key and unscramble the embedded location information in the header of the HTTP request for the content provider.

The network carrier infrastructure 200 also includes a charging platform which is configured to receive accounting information from all the participants in the runtime call flow. For example, all runtime infrastructures can be optionally connected to the charging platform in the service provider domain so as to facilitate the accounting and subsequent charging and revenue settlement processes. As a further contemplated embodiment, transaction detail records (TDR) can be provided to the charging platform from components of the infrastructure of the network carrier 200 to facilitate the accounting and subsequent charging and revenue settlement processes. The TDR can include, for example, the length and time of the transmission, the requested content, the amount of content acquired, or other information necessary to calculate a fee to charge to the content provider.

In FIG. 5, the handheld device 100 includes a local agent which caches location information from a standard Assisted GPS (A-GPS) chipset local to the handheld device 100. The local agent also has the ability to intercept HTTP traffic emanating from the browser of the handheld device in a configurable manner such that location information can be provided to the network carrier 200. Much like the embodiment of FIG. 4, the network carrier 200 can then encrypt the location information and provide such encrypted information to the content provider 300. In embodiments, the network carrier and/or handheld device and/or service provider can white-lists sites where location can be sent and blacklists sites where location cannot be sent.

In this implementation, the network carrier 200 (service provider) includes the location platform. The network carrier 200 (service provider) can also include the charging platform as discussed above. Also, in this implementation, the decryption is provided by the content provider 300; although, it is contemplated by the present invention that the network carrier 200 (service provider) can include decryption services. Also, the TDR can be provided to the carrier 200 from the remaining participants, 100, 300.

ILLUSTRATIVE EXAMPLES

By way of an example, a free weather web site utilizes advertisement as a main source of revenue. This site wants to test the impact of location based services and advertisement, but by implementing the invention it no longer has to go through the expensive and complex process of integrating with a carrier's location platform. Instead, the weather web-site simply acquires a trial decryption key or a trial client ID from the network carrier for a limited amount of time. After making minimal changes to their web application to access the user's location from the HTTP request, the site no longer has to prompt the user for their location. Additionally, the advertisements on the web site are now targeted based on the user's location. In this way, the weather website experiences increased user traffic because their website can offer immediate local weather on the first page. The weather website also experiences an increase in advertisement clicks because they are more relevant to the user. The weather website considers this a successful trial of location based services and signs up for a more permanent plan with the network carrier to continue their access to a location decryption method.

In use, a subscriber turns on his/her mobile browser on his handheld device and goes to a weather site. The handset housed agent (or the proxy agent on the carrier network) intercepts the HTTP stream and adds a scrambled location tag to the header. The weather site receives the request and as a result of its arrangement with the network carrier, has the key to descramble the tag in the HTTP header. The weather site can now determine the subscriber coarse or fine (cell sector) location and provide location sensitive weather information to the subscriber. The subscriber can now plan his/her activities based on the location specific weather report.

While the invention has been described in terms of embodiments, those skilled in the art will recognize that the invention can be practiced with modifications and in the spirit and scope of the appended claims.

What is claimed is:

1. A system comprising:
a processor;
one or more computer readable hardware storage devices; and
program instructions stored on the one or more computer readable hardware storage devices for execution by the processor, the program instructions comprising:
program instructions to determine whether a location of a remote user was obtained locally at a handheld device of the remote user;
program instructions to determine location information of the remote user that is outside an infrastructure of the carrier network;
program instructions to determine whether decryption of the location information for the content provider will be handled by the carrier network;
program instructions to secure the location information of the remote user;
program instructions to insert the secure location information into a message; and
program instructions to forward the message including the secure location information directly to a content provider;
program instructions to generate and provide a decryption key to the content provider configured to decrypt the secure location information;
program instructions to determine whether the remote user is entitled to location services or content of the content provider;
program instructions to determine whether to provide the decryption key to the content provider based on a charging model of the content provider;

program instructions to receive cached location information of the remote user from the remote user;
program instructions to scramble the cached location information in the header of the HTTP request; and
program instructions to bundle service subscription information and an authorization key in the HTTP header with the cached location information.

2. The system of claim 1, further comprising a location platform determines coarse and fine location of the remote user.

3. The system of claim 1, wherein the program instructions further comprise:
program instructions to intercept the message, wherein the message is the HTTP request sent by the remote user to the content provider via the carrier network;
program instructions to insert the secure location information in a header of the HTTP request; and
program instructions to forward the HTTP request including the secure location information to the content provider.

4. The system of claim 1, wherein the program instructions further comprise program instructions to receive a decrypt request from the content provider.

5. The system of claim 1, wherein:
the content provider is configured to generate and provide location specific content to the remote user; and
the remote user caches and encrypts the cached location information from an Assisted Global Positioning System (A-GPS) in the remote user.

6. The system of claim 1, wherein the program instructions further comprise program instructions to charge a fee to the content provider for the location information.

7. The system of claim 6, wherein the program instructions to charge the fee charge the content provider a flat fee or a fee based on coarse or fine location information.

8. The system of claim 1, wherein:
the infrastructure of the carrier network is separate from the remote user;
the content provider is separate from the infrastructure of the carrier network and the remote user; and
the program instructions to determine the location information perform the determination in response to a request transmitted by the remote user to the content provider via the infrastructure of the carrier network and provide the location information to an encryption service.

9. The system of claim 1, wherein the system comprises a computer infrastructure of a carrier network, including a location platform and an encryption service, which is at least one of supported, deployed, maintained, and created by a service provider.

10. A method for obtaining location specific content comprising:
intercepting, by an encryption service of a carrier network, an HTTP request sent from a remote user that is outside an infrastructure of the carrier network to a content provider;
determining that a location of the remote user was not obtained locally at a handheld device of the remote user;
receiving cached location information of the remote user from the remote user;
based on the determining, scrambling, by the encryption service, the cached location information of the remote user and inserting the scrambled cached location information into a header of the HTTP request;
sending, by the encryption service, the HTTP request including the scrambled cached location information directly to the content provider;
providing a decryption key to the content provider which ensures secure transmission of the location information and provides authorization to the content provider to decrypt and use the location information for location specific content dissemination;
determining whether the remote user is entitled to services or content of the content provider;
determining whether to provide the decryption key to the content provider based on a charging model of the content provider; and
bundling service subscription information and an authorization key in the HTTP header with the cached location information,
wherein the content provider is configured to generate and provide the location specific content to the remote user.

11. The method of claim 10, further comprising determining the location information of the remote user.

12. The method of claim 11, wherein the determining location information includes one of: fine location, coarse location and a combination of fine location and coarse location.

13. The method of claim 10, wherein the location information is received from the remote user by an agent locally resident on a computing device.

14. The method of claim 10, further comprising charging a content provider for the scrambled location information.

15. The method of claim 10, further comprising providing decryption services to the content provider in order to descramble the scrambled location information.

16. A computer program product comprising a tangible computer readable hardware storage device having readable program instructions stored on the computer readable hardware storage device, the program instructions comprising:
program instructions to obtain, by an encryption service, cached location information of a remote user that is outside an infrastructure of the carrier network;
program instructions to intercept, by the encryption service, an HTTP request transmitted from the remote user to a content provider using the carrier network;
program instructions to determine whether the cached location information was obtained locally at a handheld device of the remote user;
program instructions to determine whether decryption of location information for the content provider will be handled by the carrier network;
program instructions to scramble, by the encryption service, the cached location information and insert the scrambled cached location information into a header of the HTTP request;
program instructions to transmit, by the encryption service, the scrambled cached location information directly to the content provider;
program instructions to provide a decryption key to the content provider configured to decrypt the scrambled cached location information based on a charging model of the content provider;
program instructions to generate and provide a decryption key to the content provider configured to decrypt the secure location information;
program instructions to determine whether the remote user is entitled to services or content of the content provider; and
program instructions to bundle service subscription information and an authorization key in the HTTP header with the cached location information.

17. The computer program product of claim 16, wherein the program instructions further comprise program instructions to charge a fee to the content provider for the location information.

18. The system of claim 1, wherein:

the system comprises an infrastructure of the carrier network, including an encryption service, a decryption service, and a charging platform;

the message is the HTTP request transmitted by the remote user to the content provider;

the carrier network is configured to intercept the HTTP request;

the location platform is configured to scramble the location information;

based on a determination that the location information was not obtained locally at a handheld device of the remote user, the encryption service is configured to:

obtain the scrambled location information from the location platform;

embed the scrambled location information into the HTTP request;

send the HTTP request with the scrambled location information to the content provider; and provide a transaction detail record to the charging platform;

based on a determination that the decryption of location information for the content provider will be handled by the carrier network, the decryption service is configured to:

receive a decrypt request from the content provider; and provide a decryption key to the content provider for unscrambling the scrambled location information; and the charging platform is configured to charge a fee to the content provider based on the transaction detail record.

19. The system of claim 1, wherein the program instructions further comprise:

program instructions to provide the authorizing key to the content provider based on a determination that the remote user is entitled to the location services; and program instructions to, based on a determination that the location information was obtained locally at a handheld device of the remote user, establish a routing proxy including a routing table which stores routing information and matching information between the remote user and the content provider.

* * * * *